(12) United States Patent
Kashima et al.

(10) Patent No.: US 6,630,561 B2
(45) Date of Patent: Oct. 7, 2003

(54) CRYSTALLINE POLYESTERPOLYOL AND HOT-MELT ADHESIVE

(75) Inventors: Mikito Kashima, Chiba (JP); Yumiki Noda, Chiba (JP); Harutoshi Hoshino, Chiba (JP); Toshikazu Machida, Chiba (JP); Hideki Ichihashi, Yamaguchi (JP); Fumio Adachi, Yamaguchi (JP); Yukio Kaneko, Yamaguchi (JP)

(73) Assignee: UBE Industries, Ltd., Yamaguchi (JP)

( * ) Notice: Subject to any disclaimer, the term of this patent is extended or adjusted under 35 U.S.C. 154(b) by 0 days.

(21) Appl. No.: 09/838,036

(22) Filed: Apr. 19, 2001

(65) Prior Publication Data

US 2003/0018157 A1 Jan. 23, 2003

(30) Foreign Application Priority Data

| Apr. 24, 2000 | (JP) | P.2000-122890 |
| May 2, 2000 | (JP) | P.2000-133384 |
| Oct. 10, 2000 | (JP) | P.2000-309015 |
| Oct. 19, 2000 | (JP) | P.2000-318834 |
| Feb. 5, 2001 | (JP) | P.2000-027778 |

(51) Int. Cl.[7] .................. C09J 175/06; C08L 75/06; C08G 18/42
(52) U.S. Cl. ............ 528/83; 525/440; 528/80; 528/905
(58) Field of Search ............ 525/440; 528/80, 528/83, 905

(56) References Cited

U.S. PATENT DOCUMENTS

| 5,019,638 A | 5/1991 | Muller et al. ............ 528/83 |
| 5,115,073 A | 5/1992 | Meckel et al. ............ 528/83 |
| 5,162,457 A | * 11/1992 | Hansel et al. ............ 525/454 |
| 5,407,517 A | * 4/1995 | Hansel et al. ............ 528/59 |

FOREIGN PATENT DOCUMENTS

| EP | 0 232 055 A2 | 8/1987 |
| EP | 0 246 473 A1 | 11/1987 |
| EP | 0 248 658 A2 | 12/1987 |
| EP | 0 448 825 A2 | 10/1991 |
| EP | 0 484 761 A1 | 5/1992 |
| EP | 0 569 146 A2 | 4/1993 |
| JP | 2-88686 | 3/1990 |
| JP | 3-152112 A | 6/1991 |
| WO | WO 99/28367 A1 | 6/1999 |

OTHER PUBLICATIONS

Secchaku, vol. 28, No. 28, No. 8, p. 5 (1984); and
H.F. Huber et al., *Adhesive Age*, pp. 32–35 (Nov. 1987).

* cited by examiner

*Primary Examiner*—Rabon Sergent
(74) *Attorney, Agent, or Firm*—Akin Gump Strauss Hauer & Feld, L.L.P.

(57) ABSTRACT

A crystalline polyesterpolyol having a number average molecular weight of 1,500 to 15,000 and obtainable from a polybasic carboxylic acid component and an aliphatic hydrocarbon diol component comprising 1,10-decanediol and/or 1,12-dodecanediol, and a hot-melt adhesive comprising a reaction product of a polyisocyanate and a polyesterpolyol, which contains a crystalline polyesterpolyol having a number average molecular weight of 1,500 to 15,000 and obtainable from a polybasic carboxylic acid component and an aliphatic hydrocarbon diol component comprising 1,10-decanediol and/or 1,12-dodecanediol are provided.

5 Claims, No Drawings

CRYSTALLINE POLYESTERPOLYOL AND HOT-MELT ADHESIVE

FIELD OF THE INVENTION

The present invention relates to a crystalline polyesterpolyol obtainable from a polybasic carboxylic acid component and an aliphatic hydrocarbon diol component comprising 1,10-decanediol and/or 1,12-dodecanediol. The crystalline polyesterpolyol of the invention is capable of crosslinking with various crosslinking agents, and is useful for producing paints, adhesives, inks, and sealants.

The present invention also relates to a hot-melt adhesive comprising a crystalline polyesterpolyol having a number average molecular weight of 1,500 to 15,000 and obtainable from a polybasic carboxylic acid component and an aliphatic hydrocarbon diol component comprising 1,10-decanediol and/or 1,12-dodecanediol. The hot-melt adhesive of the invention necessitates an extremely short period of time for adhesion and is also excellent in adhesion strength, so that it can be used for various purposes as an adhesive.

BACKGROUND OF THE INVENTION

Polyesters are well known compounds in the art and various polyesters are employed. In particular, polyesterpolyols are capable of crosslinking and curing with various crosslinking agents such as isocyanate compounds, and are widely used as paints, adhesives, inks, and sealants.

Among them, a crystalline polyesterpolyol has characteristics that it can be handled as a liquid having relatively low viscosity at a temperature of the melting point or higher and it solidifies within a short period of time through recrystallization when it is cooled at or below the crystallizing temperature in addition to its excellent mechanical properties. Owing to the characteristics, its use as components for reactive hot-melt adhesives and hot melt-type ink jet inks have been expanding.

Particularly, the market of the reactive hot-melt adhesives have been rapidly growing since they match social needs of lessening solvent and saving energy together with its excellent strength and adhering speed and high applicability to product lines in assembly industries. Furthermore, there is a strong demand for the enhancement of efficiency of continuous working, and therefore, a reactive hot-melt adhesive having more rapid setting rate is desired.

In order to meet the demand, combinations of a reactive hot-melt adhesive with an adhesive resin or a thermoplastic polymer have been examined. For example, European Patent Application Publication No. 0232055A describes a combination with an ethylene/vinyl acetate comonomer or a methylstyrene resin, and European Patent Publication No. 0246473A describes a combination with an acrylate oligomer. However, such reactive hot-melt adhesive contains a thermoplastic resin in high ratio even after the curing by crosslinking, so that the decrease of shear strength at high temperature cannot be avoided.

On the other hand, European Patent Application Publication No. 0248658A discloses a polyester-type hot-melt adhesive using an aromatic dicarboxylic acid. The use of an aromatic polyester improves the thermal resistance but there is a disadvantage that the viscosity at the melting is too high and therefore the workability at its application remarkably decreases.

Hitherto, as the raw materials used for the reactive hot-melt adhesives, terephthalic acid, isophthalic acid, succinic acid, adipic acid, azelaic acid, sebacic acid, dodecanedioic acid, etc. are known as the polybasic carboxylic acid component, and ethylene glycol, propylene glycol, 1,4-butanediol, 1,5-pentanediol, 1,6-hexanediol, 1,4-cyclohexanedimethanol, etc. as the diol component.

On the other hand, it is known, as described in Secchaku, vol. 28, No. 8, p. 5 (1984) and ADHESIVE AGE, p. 32, November (1987), that the crystallinity of a polyesterpolyol affects the setting rate. Namely, a polyesterpolyol having high crystallinity is extremely advantageous for accelerating the setting rate. Among the polyesterpolyols obtained from the above monomer combinations, Japanese Patent Laid-Open No. 88686/1990 discloses those wherein dodecanedioic acid and 1,6-hexanediol or sebacic acid and 1,6-hexanediol are used as raw materials for producing a reactive hot-melt adhesive having improved setting rate, a polyesterpolyol wherein dodecanedioic acid and ethylene glycol are used, and the like. However, it becomes difficult to satisfy the demand for further rapid setting with these combinations.

SUMMARY OF THE INVENTION

An object of the invention is to provide a crystalline polyesterpolyol producible from easily available raw materials, capable of rapid setting and rapid drying as a component of adhesives, paints and inks, and imparting sufficient adhesion strength.

Another object of the invention is to provide a hot-melt adhesive producible from easily available raw materials, capable of rapid setting and rapid drying, and imparting sufficient adhesion strength.

As a result of extensive studies for solving the above problems, the present inventors have found that a polyesterpolyol, obtainable from a polybasic carboxylic acid component and an aliphatic hydrocarbon diol component, wherein an aliphatic hydrocarbon diol component comprising 1,10-decanediol and/or 1,12-dodecanediol is used and a number average molecular weight is from 1,500 to 15,000 becomes a crystalline polyesterpolyol. Accordingly, they have reached the present invention.

The present inventors further have found out a hot-melt adhesive comprising the crystalline polyesterpolyol, and therefore, have reached the present invention.

DETAILED DESCRIPTION OF THE INVENTION

The following will explain the invention in detail.

The aliphatic hydrocarbon diol component to be used in the invention comprises 1,10-decanediol and 1,12-dodecanediol. Preferred is 1,12-dodecanediol. These are used solely or as a mixture. Furthermore, they can be mixed with an aliphatic hydrocarbon diol component having carbon atoms less than that of 1,10-decanediol. The amount of 1,10-decanediol or 1,12-dodecanediol to be used at that time is not particularly limited but, in the case of obtaining a crystalline polyesterpolyol, the amount is 1 mol % or more, preferably 5 mol % or more, more preferably 20 mol % or more of the total aliphatic hydrocarbon diol component. In particular, at the amount of 20 mol % or more, a high crystalline polyesterpolyol is obtained.

The polybasic carboxylic acid component to be used in the invention includes an aliphatic dicarboxylic acid and an aromatic dicarboxylic acid, and includes an aliphatic dicarboxylic acid having 2 to 12 carbon atoms and an aromatic dicarboxylic acid. Preferred is an aliphatic dicarboxylic acid having 2 to 12 carbon atoms, and more preferred is an aliphatic dicarboxylic acid having 2 to 6 carbon atoms. Concrete examples include oxalic acid, succinic acid, adipic acid, pimelic acid, suberic acid, azelaic acid, sebacic acid, dodecanedioic acid, isophthalic acid, terephthalic acid, and the like. Preferred are oxalic acid, succinic acid, adipic acid, pimelic acid, suberic acid, azelaic acid, sebacic acid, and dodecanedioic acid. These may be used solely or as a mixture.

The polyesterpolyol according to the invention can be obtained by subjecting the above-described aliphatic hydrocarbon diol component and the polybasic carboxylic acid component to known dehydrative polycondensation. Usually, the equivalent ratio of the hydroxyl group of the aliphatic hydrocarbon diol component and the carboxyl group of the polybasic carboxylic acid component (hydroxyl group/carboxyl group) is preferably from 1.02 to 1.5, more preferably from 1.05 to 1.3. Concretely, the esterification is carried out by subjecting the predetermined amount of the aliphatic hydrocarbon diol component and the polybasic carboxylic acid component to dehydrative polycondensation in the presence or absence of a catalyst at a temperature range of 150 to 250° C. for about 3 to 20 hours.

As the catalyst, it is preferable to carry out the reaction in the presence of a titanium catalyst such as titanium tetrabutoxide or a tin catalyst such as dibutyltin oxide owing to its acceleration of the dehydrative polycondensation. The catalyst may be charged together with the diol component and the polybasic carboxylic acid component, or may be added after the proceeding of pre-polymerization in the absence of any catalyst. At the production of the polyesterpolyol, it is desirable to carry out the production so that its both ends become almost hydroxyl groups and no terminal carboxyl group is formed. For this purpose, it is particularly effective and thus preferable to add the above-described catalyst after the pre-polymerization.

The number average molecular weight of the polyesterpolyol obtainable from a polybasic carboxylic acid component and an aliphatic hydrocarbon diol component comprising 1,10-decanediol and/or 1,12-dodecanediol is from 1,500 to 15,000, preferably from 2,000 to 10,000, more preferably from 3,000 to 8,000. When the molecular weight is less than the range, thermal resistance, chemical resistance and strength at setting are not sufficient. When it is larger than the range, the viscosity at the melting becomes high and therefore the handling becomes difficult.

The crystallinity in the invention is evaluated only by the measurement of crystallinity according to X-ray diffraction method (Ruland method) of the polyesterpolyol solidified from the melted state under cooling at a rate of 10° C./minute. Usually, the crystallinity of 40% or more is sufficient. In the case of particularly aiming at a high crystalline polyesterpolyol, the one having the crystallinity of 50% or more is preferable. The polyesterpolyol having the crystallinity of 50% to 70% is more preferable.

The polyesterpolyol to be used in the invention is a crystalline polyesterpolyol having a number average molecular weight of 1,500 to 15,000, and obtainable from a polybasic carboxylic acid component and an aliphatic hydrocarbon diol component comprising 1,10-decanediol and/or 1,12-dodecanediol. These may be used solely or as a mixture without problem.

Moreover, the polyesterpolyol may be used in combination with other polyesterpolyol. In this case, the amount of the crystalline polyesterpolyol of the invention is 0.1 wt % or more, preferably 0.5 wt % or more.

The polyisocyanate to be used in the hot-melt adhesive of the invention includes usually well-known aromatic, aliphatic and cyclic diisocyantes or highly functional or polymeric polyisocyanates. Concrete examples include 1,5-naphthylene diisocyanate, 4,4'-diphenylmethane diisocyanate, 4,4'-diphenyldimethylmethane diisocyanate, 4,4'-dibenzyl diisocyanate, tetraalkyldiphenylmethane diisocyanate, 1,3-phenylene diisocyanate, 1,4-phenylene diisocyanate, tolylene diisocyanate, butane-1,4-diisocyanate, hexamethylene duisocyanate, 2,2,4-trimethylhexamethylene diusocyanate, 2,4,4-trimethylhexamethylene diisocyanate, cyclohexane-1,4-diisocyanate, xylylene diisocyanate, isophorone diisocyanate, dicyclohexylmethane-4,4'-diisocyanate, 1,3-bis(isocyanatomethyl)cyclohexane, methylcyclohexane diisocyanate, and derivatives thereof.

The ratio of the polyesterpolyol and the polyisocyanate to be used is not particularly limited, and they can be used within a usual range. Namely, the molar ratio of the OH group of the polyesterpolyol to the NCO group of the polyisocyanate is from 1:1.2 to 1:3.0, preferably 1:1.5 to 1:2.5. The reaction conditions are also not particularly limited and the reaction is carried out under the usual conditions, concretely, at a temperature range of 50 to 150° C. for 1 to 5 hours. Also, the reaction may be carried out in a solvent.

The viscosity of the hot-melt adhesive obtainable according to the invention is 100,000 cps or less, preferably 1,000 to 50,000 cps, more preferably 3,000 to 40,000 cps at 120° C.

The hot-melt adhesive of the invention may be used as it is, and also may be used after the addition of a plasticizer, a thermoplastic polymer, a tackifier, a filler, an antioxidant, and the like which are employed for usual hot-melt adhesives.

The hot-melt adhesive obtainable according to the invention is suitable for adhesion step at continuous working process owing to its short period of time required for adhesion. For example, shoemaking industry, lumber-processing industry, paper-manufacturing industry, metal industry, resin-processing industry may be mentioned.

EXAMPLES

The following will explain the present invention concretely with reference to Examples, but the invention is not limited thereto.

Analytical Method (1) Hydroxyl Value, Acid Value and Number Average Molecular Weight The hydroxyl value and acid value of the polyesterpolyol were measured in accordance with JIS K 1557, and the number average molecular weight was calculated from the hydroxyl value.

(2) Crystallinity

The crystallinity was determined by melting the produced polyesterpolyol under heating at the melting point or higher, solidifying the melt under cooling at a rate of 10° C./minute, and, after pulverization, measuring and calculating according to X-ray diffraction method (Ruland method).

EXAMPLE 1

Dodecanedioic acid (230.3 g, 1 mol) and 1,12-dodecanediol (222.6 g, 1.1 mol) were charged into a 500 ml flask equipped with a distillation apparatus and the atmosphere in the flask was replaced with nitrogen. When the flask was heated to 160° C., water began to distill off. After stirring at 160° C. for 1 hour, stirring was continued at 170° C. for 2 hours and at 180° C. for 2 hours. Thereafter, the pressure in the flask was reduced to 100 mmHg with stirring for 0.5 hour, followed by stirring under a pressure of 50 mmHg for 0.5 hour and further under a pressure of 10 mmHg for 2 hours. After the pressure was once rendered to normal pressure, titanium tetrabutoxide (9.5 mg) was added thereto and then stirring was carried out again under a pressure of 10 mmHg for 8 hours to complete the dehydrative polycondensation. The hydroxyl value, acid value, the molecular weight and crystallinity measured by the above-described methods were found to be 28, 0.32, 4,010 and 62%, respectively.

EXAMPLES 2 TO 25 AND COMPARATIVE EXAMPLES 1 TO 3

Using the diols and the polybasic carboxylic acid components described in Table 1, the polyesterpolyols were produced in a similar manner to Example 1, and then analyzed.

EXAMPLE 26

The crystalline polyesterpolyol obtained in Example 1 (DDL+DDA)(80.0 g) was placed in a 300 ml separable flask and, after the replacement with nitrogen, the whole was heated to melt at 120° C. Then, 1/10N toluene solution of dibutyl phosphate was added in a molar amount of 1.2 times larger than that of titanium tetrabutoxide used in the polyesterpolyol synthesis, followed by stirring at 130° C. for 2 hours. Thereafter, an adhesive was synthesized by subjecting to dehydration treatment at 120° C. at 50 mmHg for 1 hour under stirring at 250 rpm, replacing with nitrogen for 10 minutes, adding MDI heated to 60° C. in advance (2.2 molar equivalents is used relative to the crystalline polyesterpolyol) all at once, and stirring at 120° C. for further 1.5 hours under a nitrogen atmosphere.

The content of isocyanate group, viscosity and setting time were measured upon the resulting adhesive. The measuring method is as follows:

TABLE 1

| | Aliphatic hydrocarbon diol component | Polybasic carboxylic acid component | Hydroxyl value mgKOH/g | Acid value mgKOH/g | Number average molecular weight | Crystallinity (%) |
|---|---|---|---|---|---|---|
| Example 1 | DDL | DDA | 28 | 0.32 | 4010 | 62 |
| Example 2 | HD:DDL = 99:1 | DDA | 26 | 0.14 | 4250 | unmeasured |
| Example 3 | HD:DDL = 95:5 | DDA | 28 | 0.17 | 4040 | 49 |
| Example 4 | HD:DDL = 90:10 | DDA | 24 | 0.22 | 4600 | 49 |
| Example 5 | HD:DDL = 80:20 | DDA | 33 | 0.09 | 3400 | 53 |
| Example 6 | HD:DDL = 60:40 | DDA | 30 | 0.19 | 3730 | 64 |
| Example 7 | HD:DDL = 20:80 | DDA | 32 | 0.13 | 3160 | 62 |
| Comparative Example 1 | HD | DDA | 30 | 0.20 | 3740 | 49 |
| Example 8 | DDL | SEA | 33 | 0.13 | 3400 | 60 |
| Example 9 | HD:DDL = 95:5 | SEA | 32 | 0.23 | 3560 | unmeasured |
| Example 10 | HD:DDL = 80:20 | SEA | 29 | 0.18 | 3870 | 51 |
| Example 11 | HD:DDL = 60:40 | SEA | 32 | 0.23 | 3510 | 56 |
| Example 12 | HD:DDL = 50:50 | SEA | 27 | 0.28 | 4160 | 59 |
| Example 13 | HD:DDL = 40:60 | SEA | 35 | 0.11 | 3210 | 55 |
| Comparative Example 2 | HD | SEA | 25 | 0.18 | 4490 | 47 |
| Example 14 | DDL | AA | 36 | 0.19 | 3120 | 60 |
| Example 15 | HD:DDL = 95:5 | AA | 31 | 0.16 | 3600 | unmeasured |
| Example 16 | HD:DDL = 80:20 | AA | 35 | 0.15 | 3210 | 41 |
| Example 17 | HD:DDL = 70:30 | AA | 33 | 0.24 | 3410 | unmeasured |
| Example 18 | HD:DDL = 60:40 | AA | 36 | 0.19 | 3120 | 45 |
| Example 19 | HD:DDL = 40:60 | AA | 34 | 0.18 | 3300 | 48 |
| Comparative Example 3 | HD | AA | 26 | 0.30 | 4320 | 43 |
| Example 20 | DL | SBA | 24 | 0.24 | 4680 | 50 |
| Example 21 | DL | AA | 28 | 0.25 | 4010 | 50 |
| Example 22 | HD:DDL = 9:1 | DDA:AA = 1:4 | 31 | 0.20 | 3570 | 45 |
| Example 23 | DDL | SBA | 34 | 0.16 | 3300 | 55 |
| Example 24 | DDL | SUA | 29 | 0.56 | 3870 | 54 |
| Example 25 | DL | DDA | 24 | 0.30 | 4680 | 58 |

DDL: 1,12-dodecanediol, DL: 1,10-decanediol, HD: 1,6-hexanediol
DDA: dodecanedioic acid, SEA: sebacic acid, SBA: suberic acid, AA: adipic acid, SUA: succinic acid
The ratio of DDL to HD is a molar ratio. The ratio of DDA to AA is also a molar ratio.

As one example illustrating the usefulness of the crystalline polyesterpolyol of the invention, a moisture-curing type hot-melt adhesive was synthesized using 4,4'-diphenylmethane diisocyanate (hereinafter, referred to as MDI), and the setting time was measured and compared.

The Measuring Methods of Physical Properties
(1) Content of Isocyanate Group
The content of isocyanate group in the adhesive synthesized by the above method was calculated according to the following method.

The synthesized adhesive (3 to 6 g) was placed in a 300 ml Erlenmeyer flask fitted with stopper, weighed and dissolved in toluene (25 ml) thoroughly. Thereto was added 10 ml of a toluene solution of dibutylamine (prepared by dissolving dibutylamine (26 g) in dry toluene (200 ml)) and the whole was well mixed with shaking. After standing for 15 minutes, 2-propanol (100 ml) and bromocresol green indicator were added and then the solution was titrated with N/2 hydrochloric acid under stirring.

Content of isocyanate (%)=21.01×(B−A)×f×100/S×1000

A: amount of N/2 hydrochloric acid required for titration of sample (ml)
B: amount of N/2 hydrochloric acid required for titration at blank test (ml)
S: weight of polyesterpolyol (g)
f: factor of N/2 hydrochloric acid (2) Viscosity Measurement It was measured by BH type viscosimeter, rotor No. 7 (φ3.175 mm, L=50 mm) at a rotation number of 10 rpm and a temperature of 120° C.

(3) Measurement of Setting Time

It was measured in accordance with method A of Japan Adhesive Industry Society Standard JAI7. A cardboard (craft liner B flute) is employed as adherend. The size of test pieces was a width of 50 mm and a length of 100 mm, and two kinds of the test pieces were prepared, one of which has a flute direction parallel to the width (test piece material C) and the other of which has a flute direction perpendicular to the width (test piece material D). An adhesive controlled at a melt temperature of 120° C. was applied on the surface of the test piece material C parallel to the flute as a string, the test piece material D was laminated therewith so that the flutes crossed each other at the backside of the material D, and the materials were pressed to form a test piece. The conditions for the adhesion were an applying amount of 3 g/m, open time of 2 seconds, and a pressing load of 2 kg. The applying position of the adhesive was determined to be a position of 25 mm apart from the longitudinal end of the test piece material C. With measuring the pressing time by means of a stopwatch, the test pieces were released from the pressing every a certain period of time. Immediately after the releasing, the adhered parts of the adhered test pieces were broken by peeling. At that time, the shortest lapsed time of the pressing at which the broken mode showed material breaking and 80% or more of the adhered test pieces showed a material breaking rate of 80% was determined as setting time. The measurement of setting time was carried out under an environment of the room temperature of 20° C.

The obtained results are summarized in Table 2.

EXAMPLES 27 TO 50 AND COMPARATIVE EXAMPLES 4 TO 6

Using the polyesterpolyols (produced in Examples 2 to 25 and Comparative Examples 1 to 3) and MDI shown in Table 2, adhesives were synthesized in a similar manner to Example 26 and the content of isocyanate group, viscosity and setting time were measured. The obtained results were also shown in Table 2.

TABLE 2

|  | Polyesterpolyol used | Content of isocyanate (wt %) | Viscosity (cps) | Setting time (sec) |
|---|---|---|---|---|
| Example 26 | DDL + DDA | 2.40 | 10000 | 1 or less |
| Example 27 | (HD:DDL = 99:1) + DDA | 1.76 | 75000 | 5 |
| Example 28 | (HD:DDL = 95:5) + DDA | 2.55 | 11000 | 2 |
| Example 29 | (HD:DDL = 90:10) + DDA | 1.71 | 57000 | 3 |
| Example 30 | (HD:DDL = 80:20) + DDA | 2.36 | 15000 | 2 |
| Example 31 | (HD:DDL = 60:40) + DDA | 1.70 | unmeasured | 2 |
| Example 32 | (HD:DDL = 20:80) + DDA | 2.40 | 34000 | 1 |
| Comparative Example 4 | HD + DDA | 2.80 | 7500 | 7 |
| Example 33 | DDL + SEA | 2.26 | 7900 | 3 |
| Example 34 | (HD:DDL = 95:5) + SEA | 2.78 | 6300 | 12 |
| Example 35 | (HD:DDL = 80:20) + SEA | 1.45 | 18000 | 3 |
| Example 36 | (HD:DDL = 60:40) + SEA | 2.35 | 8000 | 5 |
| Example 37 | (HD:DDL = 50:50) + SEA | 1.92 | 14000 | 3 |
| Example 38 | (HD:DDL = 40:60) + SEA | 2.56 | 7900 | 2 |
| Comparative Example 5 | HD + SEA | 2.53 | 17000 | 20 |
| Example 39 | DDL + AA | 2.16 | 8300 | 3 |
| Example 40 | (HD:DDL = 95:5) + AA | 2.64 | 13000 | 25 |
| Example 41 | (HD:DDL = 80:20) + AA | 2.59 | 5900 | 13 |
| Example 42 | (HD:DDL = 70:30) + AA | 2.81 | 6300 | 15 |
| Example 43 | (HD:DDL = 60:40) + AA | 2.57 | 6400 | 7 |
| Example 44 | (HD:DDL = 40:60) + AA | 2.27 | 8000 | 3 |
| Comparative Example 6 | HD + AA | 2.59 | 7500 | 40 |
| Example 45 | DL + SBA | 1.55 | 15000 | 3 |
| Example 46 | DL + AA | 2.14 | 15000 | 3 |
| Example 47 | (HD:DDL = 9:1) + (DDA:AA = 1:4) | 2.39 | 15000 | 14 |
| Example 48 | DDL + SBA | 1.67 | 12000 | 1 or less |
| Example 49 | DDL + SUA | 2.51 | 7500 | 2 |
| Example 50 | DL + DDA | 1.62 | 22000 | 1 or less |

EXAMPLES 51 TO 54

Using the polyesterpolyol compositions as shown in Table 3 and MDI, adhesives were synthesized in a similar manner to Example 26, and the content of isocyanate group, viscosity and setting time were measured. The obtained results were also shown in Table 3.

TABLE 3

|  | Polyesterpolyol composition used (weight ratio) | Content of isocyanate (wt %) | Viscosity (cps) | Setting time (sec) |
|---|---|---|---|---|
| Example 51 | (DDL + DDA) + (HD + SEA)<br>1         99 | 2.40 | 8700 | 4 |
| Example 52 | (DDL + DDA) + (HD + SEA)<br>5         95 | 2.37 | 8700 | 3 |
| Example 53 | (DDL + DDA) + (HD + AA)<br>1         99 | 2.54 | 7500 | 13 |
| Example 54 | (DDL + DDA) + (HD + AA)<br>5         95 | 2.54 | 8700 | 13 |

According to the invention, a crystalline polyesterpolyol can be provided from easily available raw materials. Such polyesterpolyol is capable of crosslinking with various crosslinking agents within a short period of time and is excellent in adhesive strength, and therefore it is useful for producing paints, adhesives, inks, and sealants. Further, it becomes possible to obtain a hot-melt adhesive producible from easily available raw materials, capable of rapid curing and rapid drying, and imparting sufficient adhesion strength.

While the invention has been described in detail and with reference to specific embodiments thereof, it will be apparent to one skilled in the art that various changes and modifications can be made therein without departing from the spirit and scope thereof.

What is claimed is:

1. A hot-melt adhesive comprising a reaction product of a polyisocyanate and a polyesterpolyol, which contains a crystalline polyesterpolyol having a number average molecular weight of 1,500 to 15,000 and is obtained from a polybasic carboxylic acid component having 2 to 10 carbon atoms and an aliphatic hydrocarbon diol component comprising 1,10-decanediol and/or 1,12-dodecanediol, wherein the crystalline polyesterpolyol has a crystallinity of 50% or more in the measurement of crystallinity by Ruland X-ray diffraction method of the polyesterpolyol solidified from the melted state under cooling at a rate of 10° C./minute.

2. The hot-melt adhesive according to claim 1, wherein the polybasic carboxylic acid component is an oxalic acid, a succinic acid, an adipic acid, a pimelic acid, a suberic acid, an azelaic acid, or a sebacic acid.

3. The hot-melt adhesive according to claim 1, wherein the polyesterpolyol has an average molecular weight of 3,000 to 8,000.

4. The hot-melt adhesive according to claim 1, wherein the aliphatic hydrocarbon diol component contains 1,10-decanediol and/or 1,12-dodecanediol in an amount of 20 mol % or more of the total diol.

5. The hot-melt adhesive according to claim 4, wherein the aliphatic hydrocarbon diol component contains 1,10-decanediol and/or 1,12-dodecanediol in an amount of 40 mol % or more of the total diol.

* * * * *